United States Patent [19]

Otten

[11] 4,273,881
[45] Jun. 16, 1981

[54] ORGANO-PHOSPHORUS FLAME-RETARDANT FOR POLYURETHANE FOAMS PREPARED FROM GRAFT POLYOXYALKYLENE POLYETHER POLYOLS

[75] Inventor: Jay G. Otten, Flat Rock, Mich.

[73] Assignee: BASF Wyandotte Corporation, Wyandotte, Mich.

[21] Appl. No.: 99,817

[22] Filed: Dec. 3, 1979

[51] Int. Cl.³ .............................................. C08G 18/14
[52] U.S. Cl. .................................. 521/108; 521/904; 521/906
[58] Field of Search ....................... 521/108, 906, 904

[56] References Cited

U.S. PATENT DOCUMENTS

| | | | |
|---|---|---|---|
| 3,789,091 | 1/1974 | Anderson et al. | 260/45.8 R |
| 3,849,368 | 11/1974 | Anderson et al. | 260/45.8 R |
| 3,875,258 | 4/1975 | Patton et al. | 528/303 |
| 3,884,849 | 5/1975 | Molbert | 521/906 |
| 4,022,718 | 5/1977 | Russo | 521/171 |
| 4,147,847 | 4/1979 | Schweiger | 521/112 |
| 4,162,353 | 7/1979 | Papa et al. | 521/107 |
| 4,194,068 | 3/1980 | Miller et al. | 521/108 |

*Primary Examiner*—Maurice J. Welsh
*Attorney, Agent, or Firm*—David L. Hedden; Norbert M. Lisicki

[57] ABSTRACT

High-resiliency flexible polyurethane foams having at least a 10 percent vinylic polymer or copolymer content may be rendered flame retardant by incorporating therein effective amounts of ANTIBLAZE 19, reputed to have the following structure

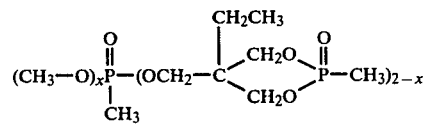

wherein x is equal to 0 or 1. This compound is also synergistic with other flame-retardant compounds.

4 Claims, No Drawings

ORGANO-PHOSPHORUS FLAME-RETARDANT FOR POLYURETHANE FOAMS PREPARED FROM GRAFT POLYOXYALKYLENE POLYETHER POLYOLS

BACKGROUND OF THE INVENTION

1. Field of the Invention

The present invention pertains to flexible foam compositions and in particular to flexible polyurethane flame-retardant foam compositions and methods for the preparation therefor. More particularly, the present invention relates to the preparation of flexible polyurethane flameretardant foam compositions which contain therein at least 10 weight percent vinylic polymer content based on the weight of the polyol and an effective amount of ANTIBLAZE 19, a flameretardant compound reputed to have the following structure:

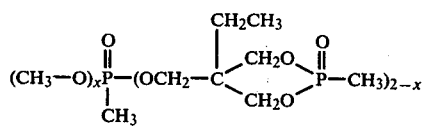

wherein x is equal to 0 or 1.

2. Description of the Prior Art

The preparation of high-resiliency, flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retardant, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)phosphate and an unsubstituted trialkylphosphate such as, for example, triethylphosphate. U.S. Pat. Nos. 3,789,091 and 3,849,368 teach the preparation of reaction products of phosphoric acids producing various products, one of which has the following formula:

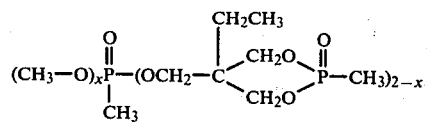

wherein x is equal to 0 or 1. These two patents furthermore teach the use of this particular compound in the preparation of flexible polyurethane foam and rigid polyurethane foam by incorporating therein the flame-retardant material. None of the above, however, teach or suggest that the problems involving polyurethane foams derived from reaction of a polyisocyanate with graft copolymer polyols are distinct over and above the normal polyurethane foams.

U.S. Pat. No. 3,875,258 teaches the preparation of graft copolymer dispersions employing monomers which have incorporated phosphorus and halogen in order to prepare urethane compositions having flame-retardant properties. The use of most flame-retardant materials with graft copolymer polyol dispersions creates serious processing problems and/or ineffectual flame-retardant properties. The present invention is directed to solving the problem involved in preparing flame-retardant graft copolymer containing polyurethane foams.

SUMMARY OF THE INVENTION

The present invention applies to both high-resiliency flexible polyurethane foam compositions and conventional flexible polyurethane foam compositions which are prepared by the reaction by an organic compound having at least two active hydrogen atoms and having therein a vinylic polymer or copolymer content with an organic polyisocyanate in the presence of specific phosphorus-containing compounds. By employing these specific phosphorus-containing compounds, improved flame-retardancy can be imparted to the polyurethane foams.

For a more complete understanding of the present invention, reference is made to the following detailed description and the examples thereof.

DESCRIPTION OF THE PREFERRED EMBODIMENTS

It has unexpectedly been found that, in the preparation of flexible polyurethane foam products which have incorporated therein vinylic copolymers, certain phosphoruscontaining compounds will impart improved flame retardancy. Moreover, it has been found that, with the use of the specific compound of the instant invention, lesser quantities of the flame-retardant compounds may be employed to pass the stringent flame-retardancy tests. The specific cyclic organic phosphorus compound, which has been found to be extremely efficient imparting flame retardancy to the resulting polyurethane foams containing vinylic polymers or copolymers is ANTIBLAZE 19, reputed to have the following structure

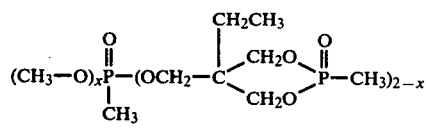

wherein X is equal to 0 or 1. Flame-retardant, flexible, high-resiliency polyurethane foams may be prepared by the reaction of a polyoxyalkylene polyether polyol having a vinylic polymer or copolymer content of at least 10 parts by weight per 100 parts of polyol and an organic polyisocyanate in the presence of various flame-retardant compounds and from 0.25 parts to 10 parts of ANTIBLAZE 19, reputed to have the following structure

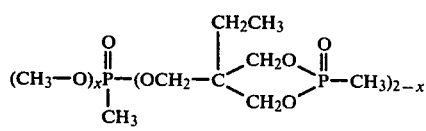

wherein x is equal to 0 or 1. Furthermore, it has been found that an improvement in the preparation of conventional flame-retardant flexible polyurethane foams from the reaction of a polyoxyalkylene polyether polyol having a vinylic polymer or copolymer content of at least 10 parts by weight per 100 parts by weight of polyol and an organic polyisocyanate, a blowing agent and flame-retardant compounds may be obtained by incorporating therein a synergistic amount of a flame-retardant compound ANTIBLAZE 19, reputed to have the following structure

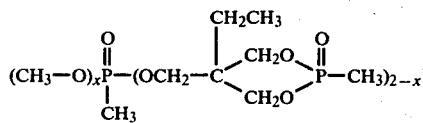

wherein x is equal to 0 or 1. The quantity of this synergistic compound, which may be employed, ranges from 0.25 part to 25 parts per 100 parts of polyoxyalkylene polyether polyol. Among the flame-retardant compounds with which the synergistic compound is effective, are ANTIBLAZE 78, reputed to be bis(2-chloroethyl) 2-chloroethylphosphonate, THERMOLIN 101, FE 55, FIREMASTER LVT23P, BROMOCHLOR 50, WILTROF HF, CITEX BC26, FYROL PCF, FYROL FR2, BCL 462, PHOSFLEX 500, BROMINEX 161, FIREMASTER 901, FR 212, FR 1138, PHOSGARD 2XC20, BC 48, PHOSGARD C-22R, BROMINEX 214P, BROMINEX 257, and FYROL 99. Other compounds which may be employed include tris-(1,3-dichloropropyl) phosphate, tris-(chloroethyl) phosphate, molybdenum trioxide, ammonium molybdate, ammonium phosphate, tetrakis-(2-chloroethyl) ethylenediphosphate, pentabromodiphenyloxide, tricresyl phosphate, 2,3-dibromopropanol, hexabromocyclododecane, and dibromoethyldibromocyclohexane. Those preferred are bis-(2-chloroethyl)2-chloroethylphosphonate, tris-(2,3-dibromopropyl) phosphate, hexabromocyclododecane and 2,3-dibromopropanol and tetrakis-(2-chloroethyl)ethylene diphosphate.

The polyols which have incorporated therein the vinylic copolymers are prepared by the in situ free-radical polymerization of an ethylenically unsaturated monomer or mixtures of said monomers in a polyoxyalkylene polyether polyol. These polymerizations may be carried out at a temperature between 80° C. and 170° C., preferably between 85° C. and 135° C.

The polyols which may be employed in the preparation of the graft copolymer dispersions are well known in the art. Both conventional polyols essentially free from ethylenic unsaturation such as those described in U.S. Pat. No. 28,715 and unsaturated polyols such as those described in U.S. Pat. No. 3,652,659 and Reissue 29,014 may be employed in preparing the graft copolymer dispersions used in the instant invention. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyalkylene polyether polyols, polyhydroxy-terminated polyurethane polymers, polyhydroxylcontaining phosphorus compounds, and alkylene oxide adducts of polyhydric sulfur-containing esters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha,beta-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, alphamethyl glucoside, pentaerythritol, and sorbitol. Also included within the term "polyhydric alcohol" are compounds derived from phenol such as 2,2'-bis(4,4'-hydroxyphenyl)-propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides includes the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,4-diaminotoluene; aliphatic amines such as methylamine, triisopropanolamine, ethylenediamine, 1,3-diaminopropane, 1,3-diaminobutane, and 1,4-diaminobutane.

Also, polyols containing ester groups can be employed in preparing the graft copolymer dispersions. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate or epoxy group or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether(1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to convert the carboxyl group to a terminal hydroxyl group prior to employment in the present invention. The amount of alkylene oxide employed is such as to reduce the acid number of the unsaturated polyol to about one or less.

To prepare the unsaturated polyols for use in the preparation of graft copolymer dispersions, from about 0.05 mole to about 3.0 moles, preferably from 0.30 mole to 1.50 moles, of said unsaturated organic compound per mole of polyol is employed. The preparation of the unsaturated polyols follows the conditions of the prior art procedures such as disclosed in U.S. Pat. Nos. 3,275,606 and 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

As mentioned above, the graft copolymer dispersions used in the invention are prepared by the in situ polymerization, in the above-described polyols of an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, alpha-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl-4-vinylbenzoate, phenoxystyrene, p-vinyl diphenyl sulfide, p-vinylphenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloroacrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylcrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl arylate, vinyl methacrylate, vinyl methoxyacetate, vinyl benzoate, vinyl iodide, vinyltoluene, vinylnaphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylthioethyl ether, vinyl methyl ketone, vinyl ethyl ketone, vinyl phosphonates such as bis(beta-chloroethyl) vinylphosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. Preferably, the monomer is selected from the group consisting of acrylonitrile, styrene and mixtures thereof.

The amount of ethylenically unsaturated monomer employed in the polymerization reaction is generally from one percent to 50 percent, preferably from 10 percent to 40 percent, based on the total weight of the product. The polymerization occurs at a temperature between about 80° C. and 170° C., preferably from 85° C. to 135° C.

Illustrative catalysts which may be employed for the polymerization of vinyl monomers are the well-known free radical types of vinyl polymerization catalysts, for example, the peroxides, persulfates, perborates, percarbonates, azo compounds, etc., including hydrogen peroxide, benzoyl peroxide, acetyl peroxide, benzoyl hydroperoxide, t-butyl hydroperoxide, t-butyl peroxide, lauroyl peroxide, butyryl peroxide, diisopropylbenzene hydroperoxide, cumene hydroperoxide, paramenthane hydroperoxide, diacetyl peroxide, alpha-cumyl peroxide, propyl peroxide, isopropyl peroxide, isopropyl-t-butyl peroxide, butyl-t-butyl peroxide, furoyl peroxide, triphenylmethyl peroxide, p-methoxybenzoyl peroxide, p-methoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methyl-benzyl hydroperoxide, alpha-methylalpha-ethyl benzyl hydroperoxide, tetralin hydroperoxide, triphenylmethyl hydroperoxide, diphenylmethyl hydroperoxide, alpha-alpha'-azo-bis(2-methyl) butyronitrile, alpha,alpha'-azo-bis(2-methyl) heptonitrile, 1,1'-azo-bis(1-cyclohexane) carbonitrile, dimethyl alpha,alpha'-azo-bis(isobutyrate), 4,4'-azo-bis(4-cyanopentanoic) acid, azo-bis(isobutyronitrile), 1-t-amylazo-1-cyanocyclohexane, persuccinic acid, diisopropyl peroxy dicarbonate, and the like; a mixture of catalysts may also be used. Generally, from about 0.5 percent to about 10 percent, preferably from about 1 percent to about 4 percent, by weight of catalyst based on the weight of the monomer will be employed in the final polymerization.

The polyurethane foams employed in the present invention are generally prepared by the reaction of a graft copolymer polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Futhermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-tolylenediisocyanate, 2,6-tolylenediisocyanate, mixtures of 2,4- and 2,6-tolylene diisocyanate, 1,6-hexamethylenediisocyanate, 1,4-tetramethylenediisocyanate, 1,4-cyclohexanediisocyanate, hexahydrotolylene diisocyanate (and isomers), 1,5-naphthylenediisocyanate, 1-methoxy-2,4-phenylenediisocyanate, 4,4'-diphenylmethanediisocyanate, 4,4'-biphenylenediisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-tolylenetriisocyanate; and the tetraisocyanates such as 4,4'-dimethyl-2,2'5,5'-diphenylmethanetetraisocyanate. Especially useful due to their availability and properties are tolylene diisocyanate, 4,4'-diphenylmethanediisocyanate and polymethylene polyphenylene polyisocyanate.

Crude polyisocyanate may also be used in the compositions of the present invention, such as crude toluene diisocyanate obtained by the phosgenation of a mixture of toluene diamines or crude polymethylene polyphenylene polyisocyanate obtained by the phosgenation of crude polymethylene polyphenylene polyamine.

The graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines amino alcohols, amino acids, hydroxy acids, glycols, or mixtures thereof. A preferred group of chain-extending agents includes water and primary and secondary diamines which react more readily with the prepolymer than does water such as phenylenediamine, ethylenediamine, diethylenetriamine, N-(2-hydroxypropyl)ethylenediamine, N,N'-di(2-hydroxypropyl)-ethylenediamine, piperazine, and 2-methylpiperazine.

Any suitable catalyst may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous wetting agents have been found satisfactory. Nonionic surfactants are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

The following examples illustrate the nature of the invention. All parts are by weight unless otherwise stated. In the examples the flame retardancy of the foam samples was determined by employing the California Bulletin No. 117 flame test. The specifications to pass this test are: after-flame, maximum 10 seconds, average $\leq 5$ seconds; char length, maximum 8 inches, average $\leq 6$ inches. Those foams which passed the average after-flame and char length specifications also passed the maximum after-flame and char length requirements.

Polyol A is a glycerine propylene oxide, ethylene oxide adduct, containing 15 percent ethylene oxide a vinylic content of 20 percent and with a hydroxyl number of 40.

Polyol B is a propylene oxide adduct of glycerine with a hydroxyl number of 56.

Polyol C is a propylene oxide, ethylene oxide adduct of trimethylolpropane containing 13 percent ethylene oxide with a hydroxyl number of 35.

Polyol D is a propylene oxide, ethylene oxide adduct of glycerine containing 14 percent ethylene oxide, a vinylic content of 30 percent and a hydroxyl number of 24.

Flame-Retardant A is ANTIBLAZE 19, reputed to have the following structure

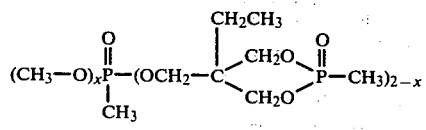

wherein x is equal to 0 or 1.

Flame-Retardant B is ANTIBLAZE 78, reputed to be bis-(2-chloroethyl)-2 chloroethylphosphonate.

Flame-Retardant C is tris-(2,3-dibromopropyl) phosphate.

Flame-Retardant D is tetrakis-(2-chloroethyl) ethylene diphosphate.

Flame-Retardant E is hexabromocyclododecane.

Flame-Retardant F is a 50/50 mixture of flame-retardant A and flame-retardant B.

EXAMPLES 1–27

A series of polyurethane foams was prepared by the following procedure:

To a one-quart capacity three and three-eights inch diameter cylindrical container and a turbine mixer fitted with a two inch diameter shrouded mixing turbine blade and operatively connected to a drill press was added: (1) 100 parts of Polyol A; (2) 4.2 parts of water; (3) 1.2 parts of silicone surfactant; (4) 0.12 part of triethylene diamine; (5) 0.2 part of stannous octoate; (6) 14 parts of flame retardant as described below; (7) 51.5 parts of toluene diisocyanate (110 INDEX). The mixture without the toluene diisocyanate was stirred for about 10 seconds. The polyisocyanate was then added to the container and the resulting mixture was stirred for about 4 to 5 seconds. The content of the container was then immediately poured into a cardboard cake box and the foam was allowed to rise therein. After foam rise was completed, the resulting foam was oven cured for about 15 minutes. The following table sets forth the flame-retardant ingredients incorporated therein in preparing the foams as well as the results of the California Bulletin No. 117 flame test for each foam.

TABLE 1

| Example | Flame Retardant | Average After Flame in Seconds | Average Char Length in Inches |
|---|---|---|---|
| 1 | Flame-Retardant A | 0 | 2.0 |
| 2 | Flame-Retardant B | 31.6 | 12 |
| 3 | Flame-Retardant F | 0.1 | 2.6 |
| 4 | Tris(1,3-dichloropropyl) phosphate | 75.3 | 12 |
| 5 | Tris(chloroethyl)phosphate | 65.1 | 12 |
| 6 | Molybdenum trioxide | 41.3 | 12 |
| 7 | Ammonium molybdate | 64.9 | 12 |
| 8 | Ammonium phosphate | 77.8 | 12 |
| 9 | CLOROWAX 70 | 146.6 | 12 |
| 10 | PHOSGARD C-22-R | 41.4 | 12 |
| 11 | Tris(dichloropropyl)phosphate | 158.6 | 12 |
| 12 | PHOSFLEX 500 | 76.9 | 12 |
| 13 | 85% tris(2,3-dibromopropyl) | 55.4 | 12 |
| 14 | Tricresyl phosphate | 143 | 12 |
| 15 | BROMINEX 214-P | 50.1 | 12 |
| 16 | BROMINEX 257 | 59.5 | 12 |
| 17 | E-7501 | 31.6 | 12 |
| 18 | E-7503 | 38.1 | 12 |
| 19 | CITEX BN-21 | 59.8 | 12 |
| 20 | CITEX BC-26 | 47.1 | 12 |
| 21 | CITEX BC-48 | 66.1 | 12 |
| 22 | FR-212 | 40.4 | 12 |
| 23 | PHOSGARD 2XC20 | 58.7 | 12 |
| 24 | FYROL PCF | 81.4 | 12 |
| 25 | BCL 462 | 79.8 | 12 |
| 26 | Flame-Retardant E | 75 | 12 |
| 27 | BROMINEX 161P | 38.6 | 12 |

EXAMPLES 28–32

Polyurethane foam samples were prepared as in Example 1 with the exception that varying amounts of flame retardant were added as listed below. The effective concentrations were determined employing the California Bulletin No. 117 flame test.

TABLE II

| Example | Flame Retardant | Parts By Wt. | Average After Flame (sec.) | Average Char Length (in.) |
|---|---|---|---|---|
| 28 | Flame-Retardant A | 8 | 6.2 | 4.0 |
|  |  | 10 | 0.1 | 1.9 |
| 29 | Flame-Retardant B | 21 | 31.9 | 12 |
|  |  | 24 | 3.5 | 3.9 |
| 30 | Flame-Retardant F | 10 | 2.9 | 2.0 |
| 31 | Flame-Retardant D | 26 | 12.1 | 6.4 |
|  |  | 29 | 5.0 | 3.2 |
| 32 | Flame-Retardant C | 16 | 7.6 | 5.8 |

TABLE II-continued

| Example | Flame Retardant | Parts By Wt. | Average After Flame (sec.) | Average Char Length (in.) |
|---|---|---|---|---|
| | | 18 | 0.1 | 2.9 |

The results of Table II indicate the minimum concentrations of flame-retardant compound required to pass the California Bulletin No. 117 flame test.

EXAMPLES 33–35

A series of polyurethane foams were prepared by the procedure of Example 1 employing the following constituents: Polyol A, 100 parts; water, 4.2 parts; silicone surfactant, 1.2 parts, triethylene diamine, 0.12 part; the flame-retardant as indicated below, stannous octoate, 0.2 part; toluene diisocyanate, 110 INDEX.

TABLE III

| Example | Flame Retardants | Parts By Wt. | Average After Flame (sec.) | Average Char Length (in.) |
|---|---|---|---|---|
| 33 | A:B (75:25) | 12 | 2.1 | 3.4 |
| 34 | A:B (25:75) | 15 | 4.4 | 3.8 |
| 35 | A:B (15:85) | 20 | 4.8 | 4.1 |

This table indicates that as the concentration of flame-retardant A is decreased, increased amounts of the mixture are necessary in order to pass the California Bulletin No. 117 flame test.

EXAMPLES 36–42

Polyurethane foams were prepared using the following formulation: Polyol A, 100 parts; water, 4.2 parts; silicone surfactant, 1.2 parts; triethylene diamine, 0.12 part; flame retardants as indicated below; stannous octoate, 0.20 part; toluene diisocyanate, 110 INDEX.

TABLE IV

| Example | Flame Retardants | Parts By Wt. | Average After Flame (sec.) | Average Char Length (in.) |
|---|---|---|---|---|
| 36 | 50/50 A/C | 8 | 17.4 | 12 |
| | | 10 | 1.3 | 3.8 |
| 37 | 50/50 A/E | 8 | 14.6 | 12 |
| | | 10 | 3.7 | 4.1 |
| 38 | 50/50 A/FIRE-MASTER 901 | 8 | 2.8 | 4.3 |
| 39 | 50/50 A/FR 212 | 10 | 3.4 | 3.2 |
| 40 | 50/50 A/BC 48 | 10 | 4.0 | 3.8 |
| 41 | 50/50 A/BROMINEX 214P | 10 | 2.4 | 4.6 |
| 42 | 50/50 A/BROMINEX 257 | 10 | 0.4 | 3.5 |

The results of Table IV indicate the synergistic effect of flame-retardant A in combination with various flame-retardant compounds.

EXAMPLES 43–44

High-resiliency polyurethane foams were prepared by the procedure of Example 1 employing the following composition: Polyol C, 60 parts, Polyol D, 40 parts; diethanolamine, 1.16 parts; water, 2.0 part; silicone surfactant, 0.90 part; triethylene diamine, 0.08 part; NIAX A-1, 0.05 part; dibutyltin dilaurate, 0.15 part; toluene diisocyanate, 29.6 parts.

TABLE V

| Example | Flame Retardant | Parts By Wt. | Average After Flame (sec.) | Average Char Length (in.) |
|---|---|---|---|---|
| 43 | B | 4.5 | 16.4 | 3.5 |
| 44 | A | 0.5 | 3.0 | 3.0 |

These results indicate that flame-retardant A is effective at a level as low as 0.5 part per 100 parts of polyol in high resiliency foam.

EXAMPLES 45–50

Foams were prepared from blends of Polyol A and Polyol B in the proportions indicated below employing the foam formulation of Example 1 with the indicated flame-retardant compounds at the designated concentrations.

TABLE VI

| Example | Blend of Polyol C & Polyol D % Vinylic Content | Flame Retardant/pbw | California Bulletin No. 117 Flame Test Average After Flame (sec.) | Average Char Length (in.) |
|---|---|---|---|---|
| 45 | 15 | D/10 | 0.6 | 2.8 |
| 46 | 15 | F/8 | 1.2 | 3.0 |
| 47 | 10 | D/7 | 0.0 | 2.8 |
| 48 | 10 | F/7 | 2.5 | 2.6 |
| 49 | 5 | D/5 | 2.9 | 3.2 |
| 50 | 5 | F/5 | 39.4 | 12 |

This table indicates that, as the vinylic content of the polyol is decreased, the efficacy of the flame-retardant blend of A and B is lessened while that of flame-retardant D increases.

The embodiments of the invention in which an exclusive privilege or property is claimed are defined as follows:

1. A flame-retardant, flexible, high-resiliency polyurethane foam prepared by the reaction of a polyoxyalkylene polyether polyol having an average equivalent weight of from 200 to 2500, a vinylic copolymer content of at least 10 parts by weight per 100 parts of polyol, and an organic polyisocyanate in the presence of a blowing agent and an effective amount of a flame-retardant compound having the following formula

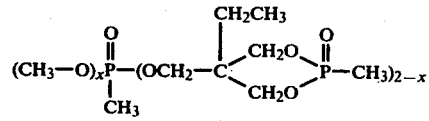

wherein x is equal to 0 or 1.

2. The flame-retardant flexible high-resiliency polyurethane foam of claim 1 wherein the amount of flame-retardant compound ranges from 0.25 part to 10 parts by weight per 100 parts of polyol.

3. In the preparation of flame-retardant, flexible polyurethane foam prepared from the reaction of a polyoxyalkylene polyether polyol having an average equivalent weight of from 200 to 2500 and a vinylic copolymer content of at least 10 parts by weight per 100 parts by weight of said polyol, an organic polyisocyanate, a blowing agent and a flame-retardant compound selected from the group consisting of bis(2-chloroethyl)-2-chloroethylphosphonate, tris(2,3-dibromopropyl)-phosphate, and hexabromocyclododecane, the improvement comprises incorporating therein a synergistic amount of a compound having the formula

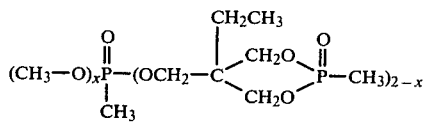

wherein x is equal to 0 or 1.

4. In the preparation of the flame-retardant flexible polyurethane foam of claim 3, the amount of synergistic compound ranges from 0.25 part to 25 parts per 100 parts of the polyol.

* * * * *